US006720751B2

(12) United States Patent
Plasz et al.

(10) Patent No.: US 6,720,751 B2
(45) Date of Patent: Apr. 13, 2004

(54) MATERIAL HANDLING SYSTEM AND METHOD OF OPERATING THE SAME

(75) Inventors: Joseph M. Plasz, Grafton, WI (US); Mark E. Ubl, Oak Creek, WI (US)

(73) Assignee: MHE Technologies, Inc., Wilmington, DE (US)

( * ) Notice: Subject to any disclaimer, the term of this patent is extended or adjusted under 35 U.S.C. 154(b) by 162 days.

(21) Appl. No.: 09/960,116

(22) Filed: Sep. 21, 2001

(65) Prior Publication Data

US 2002/0039010 A1 Apr. 4, 2002

Related U.S. Application Data

(60) Provisional application No. 60/236,856, filed on Sep. 29, 2000.

(51) Int. Cl.[7] ............................................. G05B 19/10
(52) U.S. Cl. ................................................... 318/567
(58) Field of Search ............................... 318/399, 560, 318/567, 569, 600

(56) References Cited

U.S. PATENT DOCUMENTS

| 3,772,579 A | 11/1973 | Stone et al. | |
|---|---|---|---|
| 4,374,353 A | 2/1983 | Habisohn | |
| 4,698,565 A | 10/1987 | Behnke et al. | |
| 4,953,053 A | 8/1990 | Pratt | |
| 4,965,847 A | 10/1990 | Jurkowski et al. | |
| 5,027,049 A | 6/1991 | Pratt et al. | |
| 5,179,336 A | 1/1993 | Orgovan | |
| 5,272,428 A | * 12/1993 | Spiegel et al. | 318/803 |
| 5,296,791 A | 3/1994 | Hipp | |
| 5,307,259 A | 4/1994 | Hugel et al. | |
| 5,331,267 A | 7/1994 | Anderson | |
| 5,343,134 A | 8/1994 | Wendt et al. | |
| 5,548,198 A | 8/1996 | Backstrand | |
| 5,625,262 A | 4/1997 | Lapota | |
| 5,977,737 A | * 11/1999 | Labriola, II | 318/599 |
| 6,411,052 B1 | * 6/2002 | Mir et al. | 318/434 |

* cited by examiner

*Primary Examiner*—Jeffrey Donels
(74) *Attorney, Agent, or Firm*—Michael Best & Friedrich LLP

(57) ABSTRACT

A material handling system for lifting a load and a method sensing an unstable state of the material handling system. The system includes a motor, a brake and a drive. The method includes storing a model of the motor in the drive and generating a signal in the drive. The signal has a voltage and a frequency. The method further includes providing the signal to the motor, sensing a current value of the signal, determining a modeled value based in part on the sensed current value, comparing an actual value to the modeled value to determine whether the load is stable, and generating an output that sets the brake when the load is potentially unstable.

44 Claims, 6 Drawing Sheets ically a feedback system from an encoder or tachometer to insure the motor is following a commanded speed within a predetermined window. If the motor is not following the commanded speed, then it is assumed the motor is not producing enough torque to control the load at that speed, and a brake will set. Therefore, the encoder feedback system provides an important feature for determining load integrity or stability. The encoder feedback system is particularly useful at low frequencies (e.g., at frequencies below the motor slip speed) where the hoist is most susceptible to losing load integrity.

MATERIAL HANDLING SYSTEM AND METHOD OF OPERATING THE SAME

RELATED APPLICATIONS

This application claims the benefit of prior filed co-pending U.S. provisional patent application No. 60/236,856, entitled MATERIAL HANDLING SYSTEMS AND METHOD OF OPERATING THE SAME, filed on Sep. 29, 2000.

BACKGROUND OF THE INVENTION

The invention relates to a material handling system, and particularly a method of operating a material handling system having a hoist or lifting apparatus.

It is known to use an alternating current (AC) variable frequency drive or power supply on a material handling system. The AC variable frequency drive provides power to one or more motors of a hoist or lifting apparatus. Prior systems typ

SUMMARY OF THE INVENTION

One problem with a material handling system having an encoder feedback system is that the encoder of the feedback system is attached to the hoist motor. Attaching the encoder to the motor results in more maintenance for the handling system than if no encoder is present. Additionally, an added encoder requires an extra cable between the motor and the AC drive. Eliminating the encoder feedback system reduces potential downtime due to encoder damage or malfunction, reduces potential service costs, and reduces the number of cables between the motor and the drive. Therefore, it is desirable to have a material handling system that verifies load integrity, and prevents possible load loss without the use of an encoder or similar feedback device.

Accordingly, the invention provides a material handling system including a lifting apparatus operable to lift a load, an alternating current (AC) motor connected to the lifting apparatus, a brake connected to the lifting apparatus and being operable to prevent movement of the load, an inverter electrically connected to the AC motor and being operable to generate a current capable of driving the motor, a current sensor operable to sense a current value of the inverter signal, and a controller. The controller is operable to determine an applied torque producing current value, to determine a modeled torque producing current value, and to generate a brake-control signal if the applied torque producing current value varies from the modeled torque producing current value by a deviation amount.

The invention further provides a material handling system including a rotatable drum, an alternating current (AC) motor coupled to the rotatable drum, a brake coupled to the rotatable drum and being operable to prevent the rotatable drum from rotating, and an inverter electrically connected to the AC motor. The inverter is operable to generate an inverter signal having a frequency and a voltage. The material handling system further includes a current sensor operable to sense a current value of the inverter signal, and a controller. The controller is operable to determine an actual motor speed, to determine a modeled motor speed, and to generate a brake-control signal if the actual motor speed varies from the modeled motor speed by a deviation amount.

The invention further provides a method of controlling a material handling system that lifts a load. The method includes storing a model of a motor in a drive, and generating a signal in the drive. The signal has a voltage and a frequency. The method further includes providing the signal to the motor, sensing a current value of the signal, determining a modeled value based in part on the sensed current value, comparing an actual value to the modeled value to determine whether the load is stable, and generating an output that sets the brake when the load is potentially unstable.

In another embodiment, the method includes providing a model of a motor, generating a signal in a drive, providing the signal to the motor, and sensing a current of the signal. The sensing occurs within the drive. The method further includes determining a modeled torque producing current based in part on the sensed current, determining a modeled motor speed based in part on the sensed current, and determining an applied torque producing current, and determining an actual motor speed. The method further includes calculating a first difference value between the applied torque producing current and the modeled torque producing current, comparing the first difference with a first deviation amount, setting the brake when the first difference value is greater than the first deviation amount, calculating a second difference value between the actual motor speed and the modeled motor speed, comparing the second difference value with a second deviation amount, and setting the brake when the second difference value is greater than the second deviation amount.

Other features and advantages of the invention will become apparent from the detailed description and accompanying drawings.

Figure 1:
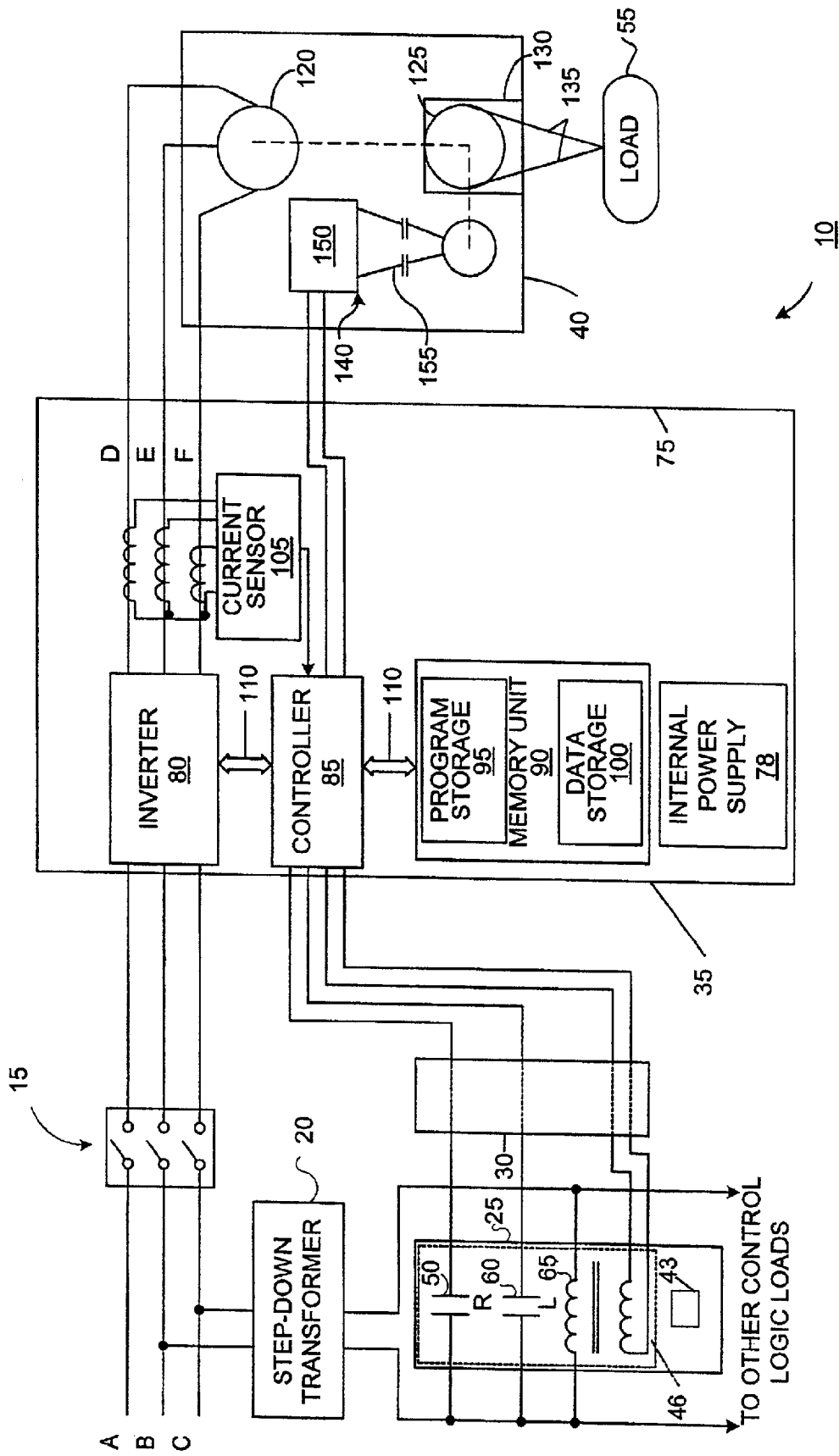
FIG. 1 is a block diagram of a material handling system embodying the invention.

Before any embodiments of the invention are explained, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The

DETAILED DESCRIPTION

A material handling system 10 of the invention is schematically shown in FIG. 1. The material handling system 10 generally includes a main switch 15, a step-down transformer 20, an operator input 25, an interface 30, an adjustable frequency alternating current (AC) drive 35, and a lifting apparatus 40.

Main switch 15 controls the power provided to the adjustable frequency AC drive 35. Upon closure of main switch 15, a fixed frequency (e.g., a 460V, 60 Hz, three-phase AC signal) is supplied from main-power lines A, B and C to the adjustable frequency AC drive 35. Although, the embodiment described herein is for a 460V, 60 Hz, three-phase signal, other fixed frequency signals (e.g., a 120V, 60 Hz, single-phase signal) may be used.

The step-down transformer 20 receives one phase of the fixed frequency signal, and "steps down" or reduces the voltage to a 120V signal. The 120V signal powers the operator input 25. Of course, other voltages may be to power the operator input 25.

The operator input 25 allows an operator to control the material handling system 10. The operator input 25 includes a first input device 43 (e.g., a push button, a switch, a key switch, etc.) that opens and closes main switch 15, a second input device (e.g., a lever, a pedal, one or more switches, one or more push buttons, a keyboard, a keypad, etc.) for entering a directional command (e.g., a "raise" or "lower" command), and a third input device (e.g., a lever, a pedal, one or more switches, one or more push buttons, a keyboard, a keypad, etc.) for entering a speed command. Of course, other inputs may be added to the operator input 25 (e.g., a safety shut-off input) or elsewhere. Additionally, the second and third input devices may be combined into one input device (e.g., a master switch or control 46). For the remainder of the detailed description, it is assumed the second and third input devices are combined in a master switch (e.g., a master lever).

As shown in FIG. 1, the operator input 25 further includes a first contact 50 that closes in response to an operator moving the master switch towards a raise position. Closing the first contact 50 generates a raise command that results in the lifting apparatus 40 raising a load 55. The operator input 25 further includes a second contact 60 that closes in response to an operator moving the master switch towards a lower position. Closing the second contact 60 generates a lower command that results in the lifting apparatus 40 lowering the load 55. Other devices or components may be used in place of the contacts 50 and 60 (e.g., solid state devices) that generate one or more directional signals indicating a desired load direction.

The operator input 25 further includes a variable reluctance transformer 65 that generates a low-voltage AC signal (e.g., a 0 to 16V AC signal) in response to an operator entering a desired speed into the master switch 46. For example, if the operator is deflecting the master switch by a distance or amount, then the transformer 65 generates a signal having a magnitude proportional to the amount of deflection. The resulting speed signal indicates a desired motor speed. Other devices or components may be used in place of the transformer 65 (e.g., solid state devices) for generating the requested speed signal.

The interface (e.g., an interface card) 30 receives the plurality of inputs from the operator input 25, and converts the inputs into a plurality of DC outputs. For example, the interface 30 receives a low voltage AC signal from the transformer 65, and converts the signal to a DC signal (e.g., a 0–10V DC signal). The DC signal is preferably proportional to the AC signal, and is provided to the adjustable frequency AC drive 35. As a second example, upon one of the relays 50 or 60 closing, an AC signal is provided to the interface card 30 which generates a DC output signal in response to the AC signal. The DC signal is then provided to the adjustable frequency drive 35.

The adjustable frequency AC drive or power supply 35 receives the fixed three-phase signal from the main power lines A, B and C, receives the directional signals from the interface 30, receives the speed signal from the interface 30, generates a current in response to the received directional signal and the speed signal, provides the current to the lifting apparatus 40, and provides a brake-control signal to the lifting apparatus 40. As shown in FIG. 1, the adjustable frequency AC power drive 35 generally includes a housing 75 that encloses an internal power supply 78, an inverter 80, a controller 85, a memory unit 90, a current sensor 105, and a bus 110. For the description below, the current generated by the inverter 80 may also be referred to as an inverter signal.

With reference to FIG. 1, the internal power supply 78 receives power from an internal bus, and produces a low-voltage DC signal. The low-voltage DC signal powers the digital components of the adjustable frequency AC drive 35.

The inverter 80 receives the substantially fixed three-phase signal from main power lines A, B and C, and generates the three-phase inverter signal on lines D, E and F. The output or inverter signal is a three-phase AC signal having a selectively variable frequency $f_{out}$ and a pulse-width-modulated (PWM) DC voltage $V_{out}$. The PWM DC voltage $V_{out}$ includes voltage pulses that are provided to the stator coils of the lifting apparatus motor (discussed below). The stator coils filter the voltage pulses, resulting in the inverter output current having a periodic AC (e.g., substantially sinusoidal) form. During operation, the inverter 80 receives the three-phase power input, rectifies the power input to DC power, and inverts the DC power to generate the inverter signal at a constant voltage-to-frequency ratio. The inverter signal is varied and controlled by one or more control signals from the controller 85 via bus 110. The phase sequence, frequency and voltage of the inverter signal on lines D, E and F control the speed and direction of the lifting apparatus 40.

The controller 85 includes a microprocessor, a memory device and an input/output (I/O) interface, which are well known in the art. In other embodiments, the controller 85 may include an application specific integrated circuit (ASIC), discrete logic circuitry or a combination of a microprocessor, an ASIC, and discrete logic circuitry. Of course, the controller 85 may include other components (e.g., drivers) not shown.

With reference to FIG. 1, the controller 85 obtains a software program having a plurality of instruction from the memory unit 90, and interprets and executes the software instructions to control the material handling system 10 as is discussed below. In general terms, the controller 85 acquires the one or more direction inputs and the speed input from the interface 30, and controls the inverter 80 and the lifting apparatus 40 in response to those inputs. Additionally, the controller 85 receives an input from the current sensor 105, receives data stored in the memory unit 90 to perform at least one level of load integrity validation, and generates an output brake signal in response to or based upon the results of the load integrity validation. Of course, other inputs may be received or other outputs may be generated by the controller 85 for implementing other aspects or features of the material handling system (e.g., an output provided to an operator display).

The memory unit 90 includes a program storage memory 95 and a data storage memory 100. The program storage memory 95 stores one or more software units or modules for operating the material handling system 10. The data storage memory 95 (e.g., an EEPROM) stores a model of the motor 120 (discussed below) used by the software program for performing at least one level of load integrity validation. The model is previously recorded within the data storage memory 100 before operation of the material handling system 10. In one embodiment, the model is obtained by performing a static parameterization test, a dynamic parameterization test and a stepped-value parameterization test. The static parameterization test determines stator resistance, stator reactance, magnetizing current, rotor resistance and rotor reactance of the motor 120 (discussed below) in a stationary state. The dynamic parameterization test determines stator resistance, stator reactance, magnetizing current, rotor resistance and rotor reactance of the motor 120 in a rotating state. The stepped-value parameterization test determines stator resistance, stator reactance, magnetizing current, rotor resistance and rotor reactance of the motor 120 rotating at various motor speed levels. Once the three parameterization tests are performed, a model of the motor is created. The model may be in the form of one or more equations and/or may include one or more look-up tables. The controller 85 uses the stored model, a commanded voltage (or frequency) of the inverter signal and a measured current to calculate a modeled value of a torque producing current (also referred to as a "modeled torque producing current"), and a motor speed (also referred to as a "modeled motor speed"). In addition, the controller 85 uses the stored model, the commanded voltage (or frequency) of the inverter signal and a measured current to calculate an applied value of the torque producing current. Preferably, the model is unique for each motor, but may be the same for a class of motors. An example modeling system is a Morris Software System version 2.2.2 embedded in a Bulletin 425 brand inverter sold by Morris Material Handling, Inc. Further, other motor modeling systems or techniques may be used to obtain a modeled value of a torque producing current, a modeled value of a motor speed and an applied value of the torque producing current.

The current sensor 105 provides a DC signal proportional to the current of the inverter signal (i.e., the current from the inverter 80 to the lifting apparatus 40). An example current sensor is a Hall-effect sensor sensing the current in all three lines D, E and F by conventional methods. Of course, other current sensors may be used and not all of the lines need to be measured.

As shown in FIG. 1, the lifting apparatus 40 includes a motor 120, a drum 125, a gear box 130, a cable 135 and a brake 140. For the embodiment described, the lifting apparatus is a hoist and, specifically, is an overhead traveling crane. U.S. Pat. No. 5,343,134, column 6, lines 17–59, which is incorporated herein by reference, describes an example overhead traveling crane. Other lifting apparatus having a motor, a brake and a lifting system may be used with the invention.

In the embodiment shown, the motor 120 is a squirrel-cage induction motor having a rated synchronous speed of 1200 revolutions-per-minute (RPM) at 60 Hz However, other AC motors with other RPM's and base frequencies may be used with the invention. The motor 120 receives the inverter signal from the adjustable frequency AC drive 35 on lines D, E and F. Upon receiving the inverter signal, the motor 120 drives the drum 125 by use of gears within gear box 130 to either wind the cable 135 onto the drum 125 or to pay the cable 135 out of the drum 125. The rotational direction of the motor 120 and, consequently, the raising and lowering of the drum 125 is determined by the phase sequence of the inverter signal provided on lines D, E and F. By winding the cable 135 onto or paying the cable 135 out of the drum 125, an object or load 55 connected with the cable 135 is raised or lowered. As used herein, the term "connection," and variations thereof (e.g., connect, connected, connecting, etc.), includes direct and indirect connections. The connection, unless specified, may be by mechanical, electrical, chemical, and/or electro-magnetic means, or any combination of the foregoing (e.g. electro-mechanical).

The brake 140 is a spring-set, electrically released brake 140 connected to a rectifier 150. Unless contacts 155 are closed, the brake is spring-set to stop the motor/gear case 130 from rotating. Upon the contacts 155 closing, a current flows resulting in the brake releasing. The opening and closing of contacts 155 is commanded by a brake-control signal from the controller 85. The brake operates to hold the load suspended when the motor is not operating, and to prevent the load from becoming uncontrolled. Of course, other brake designs or braking systems may be used to stop and hold the drum.

Figure 2:
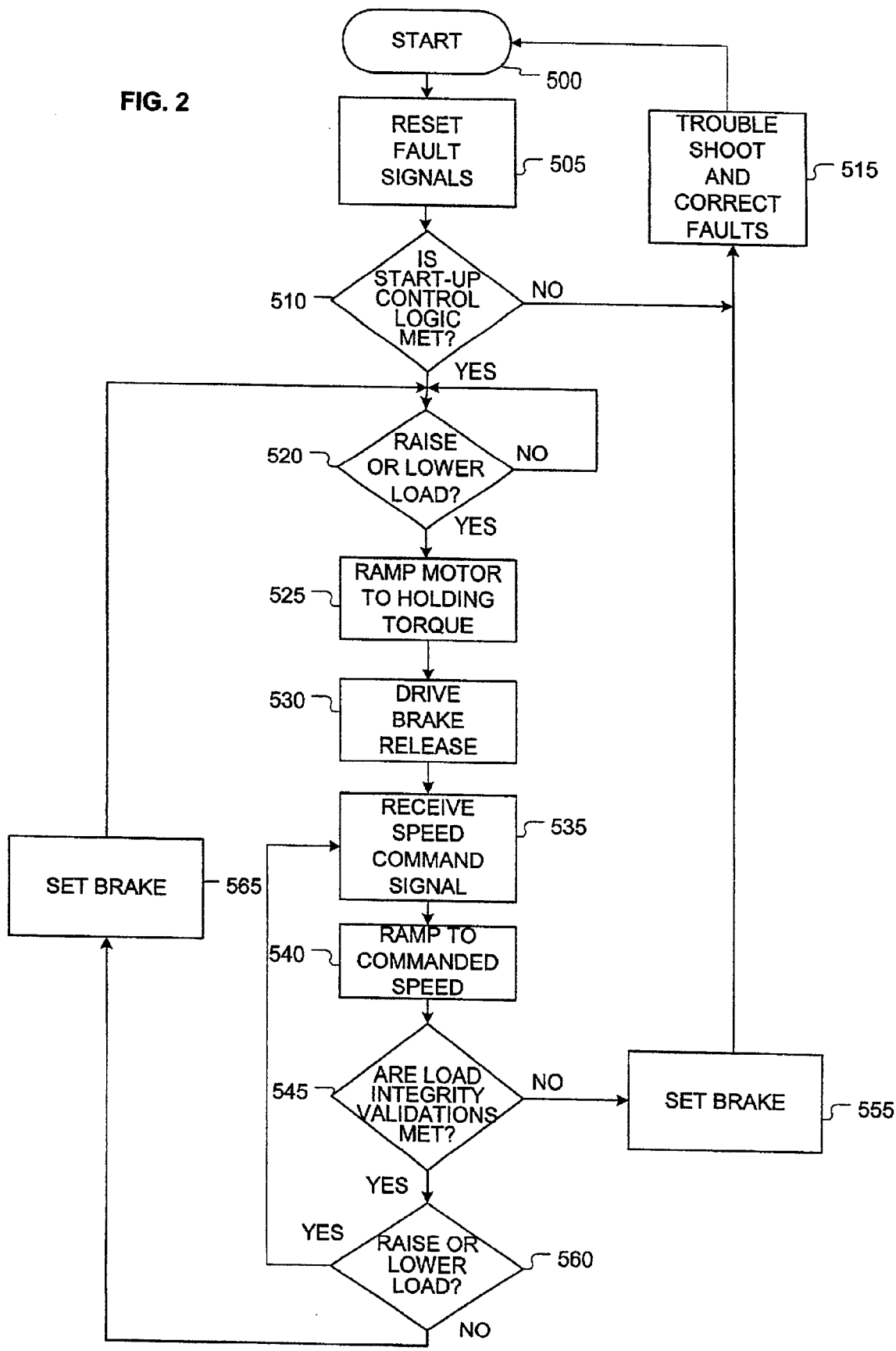
FIG. 2 is a flowchart of a method of operating the material handling system embodying the invention.

FIG. 2 shows a method of operating a material handling system 10. In operation and at act 500, an operator initiates or starts the system 10 by controlling the first input device 43 (e.g., presses a push button or turns a key switch). Starting the system 10 results in a fixed frequency and voltage signal being provided to the adjustable frequency AC drive 35. For example, the operator may press a push button that results in the main switch 15 closing. Additionally, power is provided to the operator input 25. The operator input 25 receives the power and generates a run engage or enable signal. The run-engage signal is provided to the controller 85 via a run relay (not shown). Upon receiving the run enable, the controller 85 loads one or more software units of the software program from program storage memory 95, and runs the software program to operate the adjustable frequency AC drive 35.

At act 505, the operator input 25 performs one or more internal logic checks and resets any drive faults that were previously stored during the last operation of the material handling system 10. If the internal control logic is met (act 510), then the operator input 25 is operable to generate command signals (e.g., to generate raise, lower, and speed signals), and the method proceeds to act 520. If the internal control logic is not met, then the system proceeds to act 515.

At act 515, the system 10 does not begin operation or, if already operating, ceases operation. Upon ceasing operation, an operator may trouble shoot the system to correct any system faults. To assist the operator, an error signal indicating the fault may be provided to the operator from the controller 85.

At act 520, an operator enters a direction command into the master switch 46 of the operator input 25. If the command is to raise the load, than first contact 50 closes providing a signal to the controller 85, via interface 30. If the command is to lower the load, than the second contact 60 closes providing a signal to the controller 85, via the interface 30. When the controller 85 receives a direction command, the processor proceeds to act 525. Alternatively, if the controller does not receive a direction command it continues to cycle through act 520 until a signal is received or until the operator turns the system off.

At act 525, the motor ramps to a maximum or holding torque. The holding torque is the maximum torque sufficient to hold the maximum rated load for the hoist 40 without the brake 140. To generate the holding torque, the controller 35 controls the inverter 80, resulting in the motor 120 receiving a current (i.e., the inverter signal). The current powers the motor 120 such that the motor 120 generates the holding torque. Once the controller 85 determines the amount of torque being generated by the hoist is sufficient to hold the load, then the controller 85 proceeds to act 530.

At act 530, the controller 85 provides a brake-control signal to the brake 140 resulting in the brake releasing. When the brake 140 is released, the motor 120 controls the load 145.

For acts 535, 540, 545 and 560, the controller 85 continuously cycles through these acts until either act 545 or act 560 is not met. Although acts 535, 540, 545 and 560 are shown as discrete steps, one or more of the steps may be performed at the same time or in a different order. For example, for act 540 (discussed below), the motor does not completely ramp up to the commanded speed before proceeding to act 545. Rather, the motor ramps to the command speed while acts 535, 545 and 560 are occurring.

At act 535, an operator enters a speed command into the master switch of the operator input 25. The speed command results in a variable AC signal being generated at transformer 65. The variable AC signal is converted to a DC signal by interface 30 and is provided to controller 85.

At act 540, the motor 120 ramps to the commanded speed. One method for ramping to the commanded speed entails obtaining a current value from the current sensor 105, and analyzing the current value. Based on the commanded speed, the sensed current and the modeled motor, the controller 85 determines whether the current value is too small or too large for the commanded speed. If the commanded speed is not met, then the controller 85 varies the control signal provided to the inverter 80 such that the phase sequence, frequency and voltage of the inverter signal results in a more expected current value.

At act 545, the controller 85 performs at least one load integrity validation check. That is, the controller 85 determines whether the motor is operating within sufficient parameters to support or hold the load 55. If the load 55 is secured, then the controller 85 proceeds to act 560. If the load is potentially not secured (i.e., lacks integrity) then the controller 85 proceeds to act 555.

Figure 3:
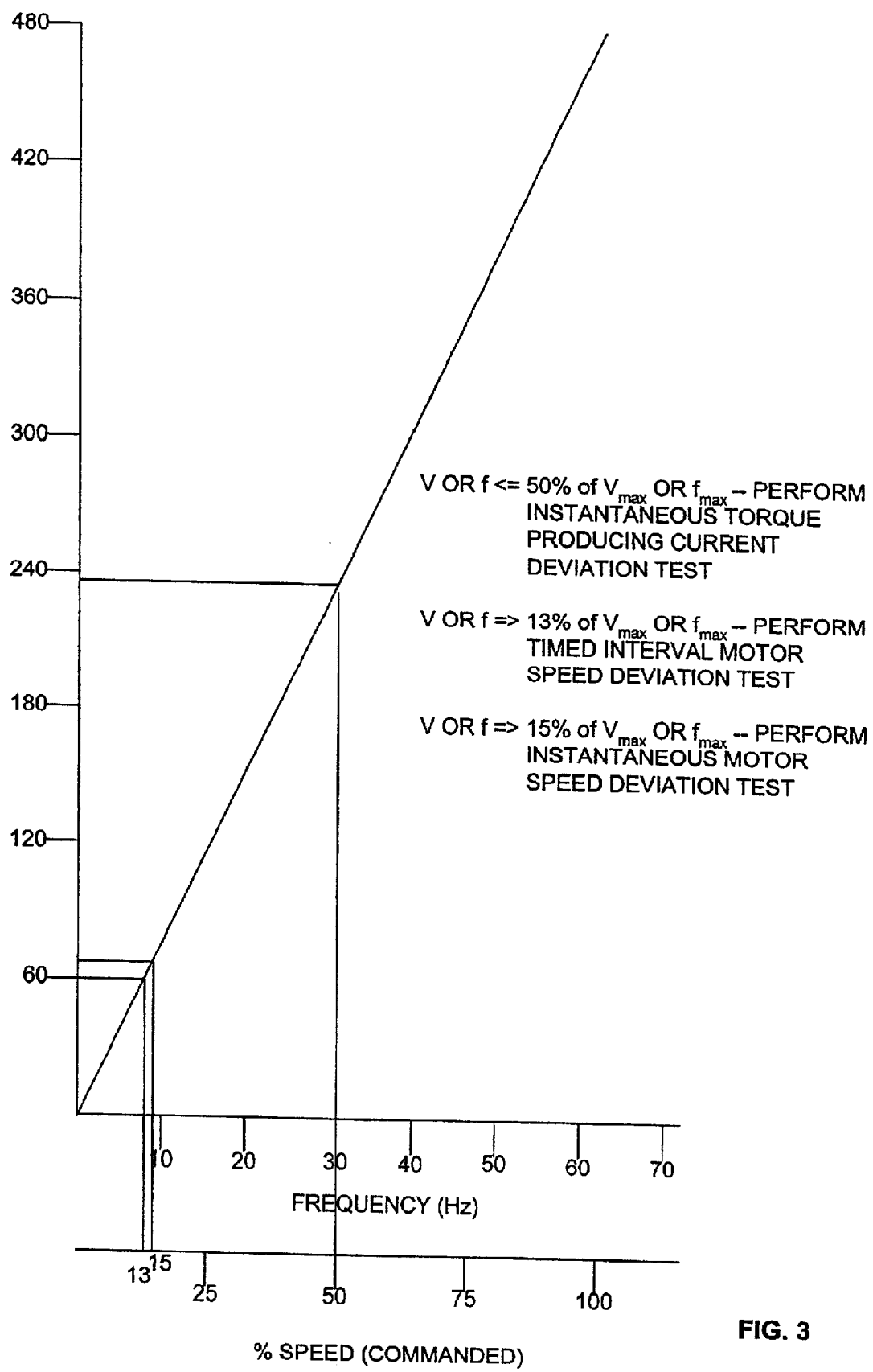
FIG. 3 is a chart representing the windows for performing the load integrity validation checks.

With reference to FIG. 3, for the preferred embodiment, the controller 85 performs three load integrity tests or checks. The first check is an instantaneous torque producing current deviation test, the second check is a timed interval speed deviation test, and the third check is an instantaneous speed deviation test. The instantaneous torque producing current deviation test compares an applied torque producing current with a modeled torque producing current at an instance. The timed interval speed deviation test compares an actual motor speed with a modeled motor speed over a time period. The instantaneous speed deviation test compares the actual motor speed with a modeled motor speed at an instance. The software uses the frequency $f_{out}$ or the voltage $V_{out}$ of the inverter signal to determine when a particular load integrity test is conducted. For example and as shown in FIG. 3, the instantaneous torque producing current deviation test is performed when the inverter signal frequency $f_{out}$ is less than or equal to fifty percent of the rated frequency for the motor 120 (e.g., less than or equal to 30 Hz for a 60 Hz motor). The instantaneous speed deviation test is performed when the applied frequency is equal to or greater than thirteen percent of the rated frequency for the motor 120 (e.g., equal to or greater than 7.8 Hz for a 60 Hz motor). The timed interval speed deviation test is performed when the applied frequency is equal to or greater than fifteen percent of the rated frequency for the motor 120 (e.g., equal to or greater than 9 Hz for a 60 Hz motor). For the embodiment described, the controller 85 performs the torque producing current deviation test at lower frequencies since the instantaneous and incremental speed deviation tests are less valid at speeds below their window. However, the percentages disclosed may be changed. In addition, other load integrity tests may be performed. For example, the software may perform a timed interval torque producing current deviation test that compares an applied torque producing current with a modeled torque producing current over a time period.

Figure 4:
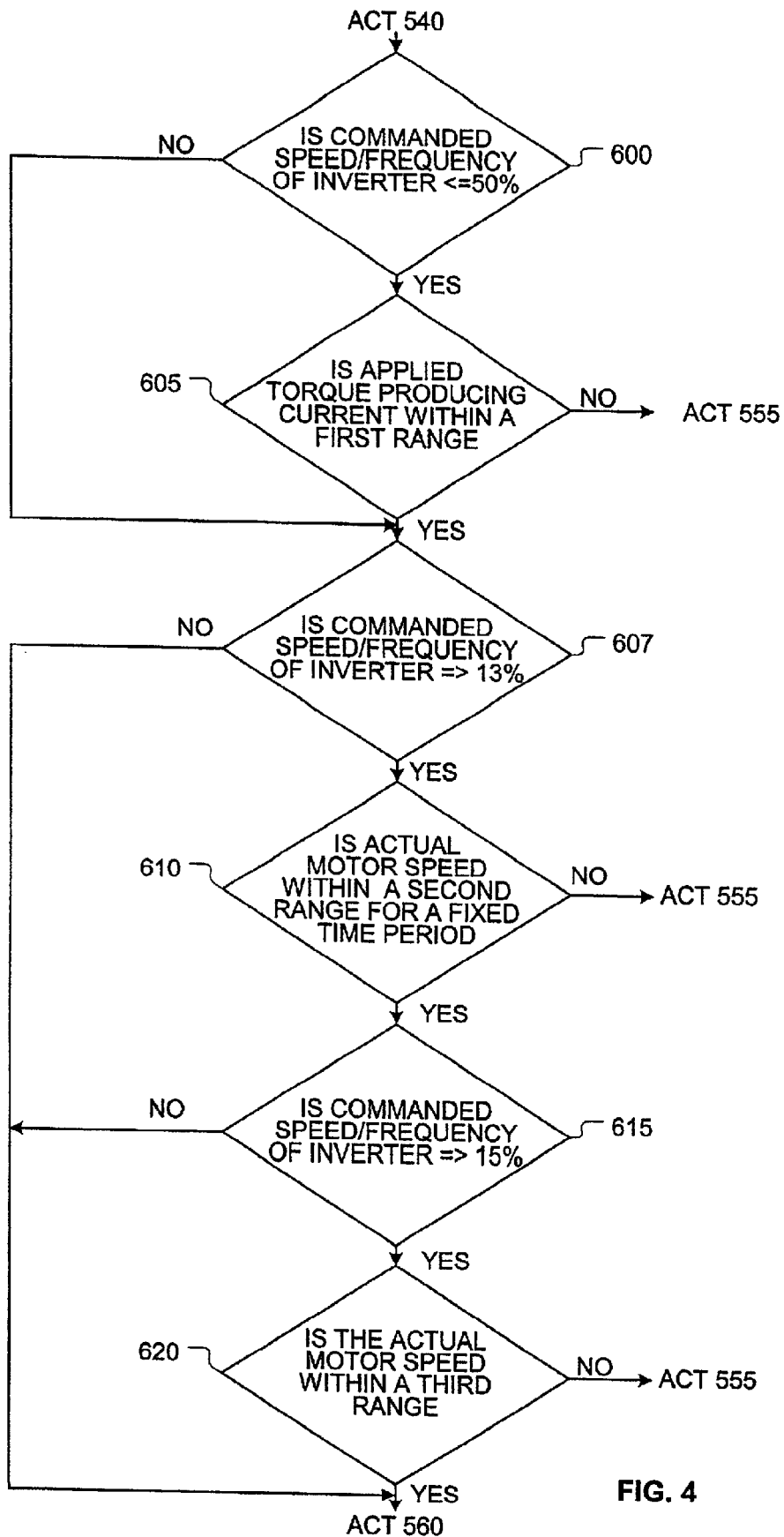
FIG. 4 is a flowchart of an exemplary method of determining if the load integrity validation checks are met.

One method for performing the three load integrity tests is shown in FIG. 4. At act 600, the controller 85 determines whether the commanded frequency of the inverter signal is less than or equal to fifty percent of the max frequency for the inverter signal (e.g., less than or equal to 30 Hz for a 60 Hz system). If the commanded frequency of the inverter signal is less then fifty percent, then the controller 85 proceeds to act 605 and performs the instantaneous torque producing current deviation test. If the commanded frequency of the inverter signal is greater then fifty percent, then the controller proceeds to act 607 and does not perform the torque producing current deviation test. As was stated previously, fifty percent is an arbitrary number and may vary.

At act 605, the controller 85 performs the instantaneous torque producing current deviation test to determine whether an applied torque producing current value varies from a modeled torque producing current value by a first deviation amount or trip value (e.g., 20% of the modeled value). An example method for performing act 605 is shown in FIG. 5.

Figure 5:
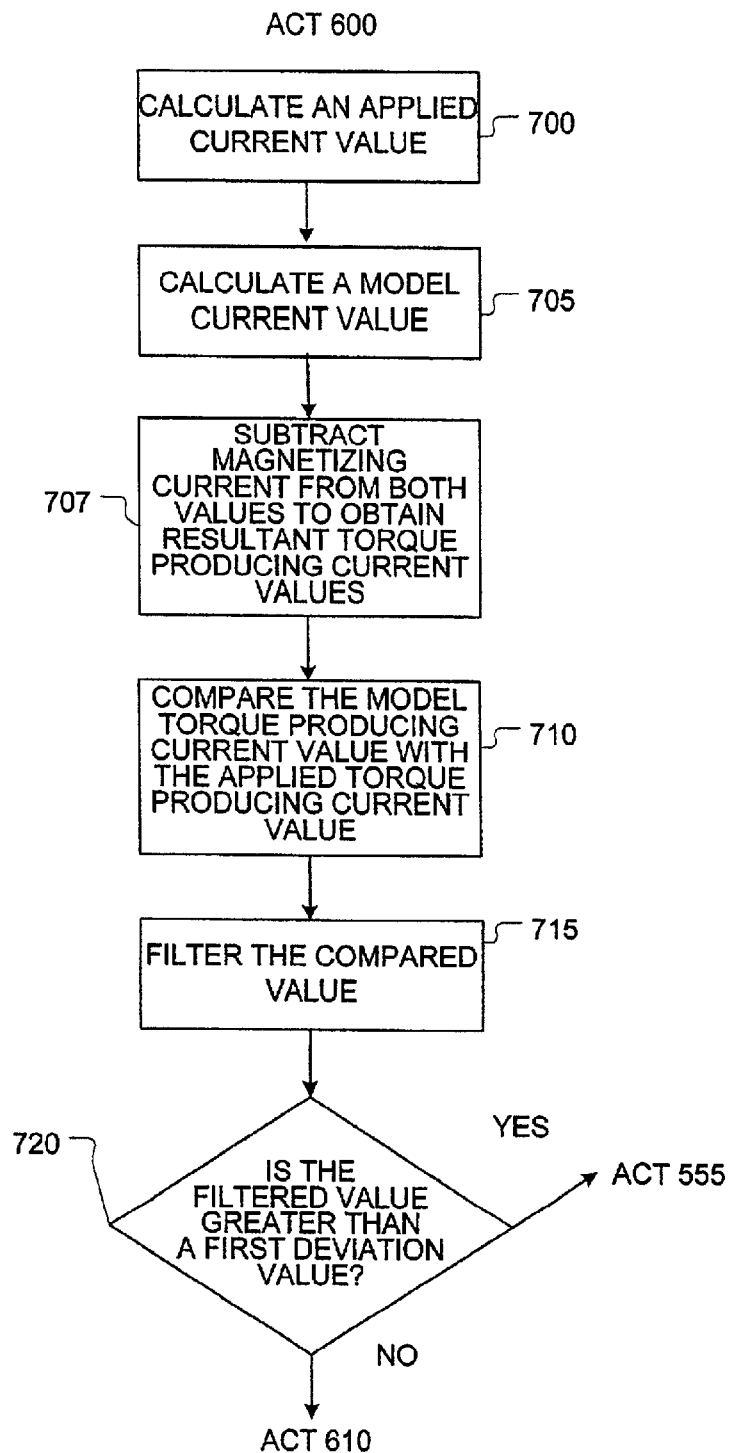
FIG. 5 is a flowchart of an exemplary method of determining if the applied torque producing current is within a first range.

With reference to FIG. 5 and at act 700, the controller 85 senses an applied current value $I_{out}$ from the current sensor 105. The applied current value $I_{out}$ is a resultant current vector having a torque producing current vector and a magnetizing current vector.

At act 705, the controller 85 calculates a modeled current value $I_{model}$. The modeled current value $I_{model}$ is calculated from the stored model and is based upon the current $I_{out}$ and the voltage $V_{out}$ from the inverter 80. For example, the controller 85 may apply the current $I_{out}$ and voltage $V_{out}$ to one or more model equations to obtain the modeled current value $I_{model}$. The modeled current value $I_{model}$ is also a resultant current vector having a torque producing current vector and a magnetizing current vector.

At act 707, the controller 85 subtracts a magnetizing current value $I_{mag}$ from the modeled current value $I_{model}$ resulting in a modeled torque producing current value $I_{mtorque}$, and subtracts the magnetizing current value $I_{mag}$ from the applied current value $I_{out}$ resulting in an applied torque producing current value $I_{atorque}$. The magnetizing current value $I_{mag}$ is obtained from the stored model and is based upon the current $I_{out}$ and the voltage $V_{out}$.

At act 710, the controller 85 compares the applied torque producing current value $I_{atorque}$ to the modeled torque producing current value $I_{mtorque}$. One method for making this comparison is subtracting the applied torque producing current value $I_{atorque}$ from the modeled torque producing current value $I_{mtorque}$ and calculating an absolute value of the result.

At act 715, a filter having a smoothing time constant filters the resulting compared value. That is, a continuous digital signal of the resulting absolute values is created and is filtered to remove unwanted high frequency noise that may result from a "jerking" of the load or from sensed noise. The filter may have a smoothing time constant of 0–50 ms with a preferred time constant of 5 ms.

At act 720, the controller 85 compares the resulting filtered value to a first deviation amount or trip value. If the filtered value is greater then the first deviation value, then the controller 85 determines that the applied torque producing current value varies too much from the modeled torque producing current value and proceeds to act 555. Otherwise, the controller 85 determines the applied torque producing current value is within range and proceeds to act 607.

Referring back to FIG. 4 and at act 607, the controller 85 determines whether the commanded frequency of the inverter signal is equal to or greater than thirteen percent of the max frequency for the inverter signal (e.g., greater than or equal to 7.8 Hz for a 60 Hz system). If the commanded frequency of the inverter signal is greater then thirteen percent, then the controller 85 proceeds to act 610 and performs the timed interval speed deviation test. If the commanded frequency of the inverter signal is less then thirteen percent, then the controller proceeds to act 560 and does not perform the timed interval speed deviation test. As was discussed previously, thirteen percent is an arbitrary number and may vary.

Act 610, the controller 85 performs the timed interval speed deviation test to determine whether the actual (e.g., calculated) speed of the motor 120 varies from a modeled speed of the motor by a second deviation amount (e.g., thirteen percent of the modeled value) for a fixed time period. If the controller 85 determines that the actual speed of the motor varies from the modeled speed by a second deviation amount for a fixed time period, then the controller proceeds to act 555. Otherwise, the controller proceeds to act 615.

At act 615, the controller 85 determines whether the commanded frequency of the inverter signal is less than or equal to fifteen percent of the max frequency for the inverter signal (e.g., is less than 9 Hz for a 60 Hz system). If the commanded frequency of the inverter signal is greater than or equal to fifteen percent, then the controller proceeds to act 620 and performs the instantaneous speed deviation test. If the commanded frequency of the inverter signal is less than fifteen percent, then the controller proceeds to act 560 and does not perform the instantaneous speed deviation test. As was discussed previously, fifteen percent is an arbitrary number and may vary.

At act 620, the controller 85 performs the instantaneous speed deviation test to determine whether the actual (e.g., calculated) speed of the motor 120 varies from a modeled speed of the motor by a third deviation amount (e.g., fifteen percent of the modeled value). If the controller 85 determines that the actual speed of the motor has varied from the modeled speed of the motor by a third deviation amount, then the controller 85 proceeds to act 555. Otherwise, the controller 85 proceeds to act 560. An example method for performing acts 607, 610, 615 and 620 is shown in FIG. 6.

Figure 6:
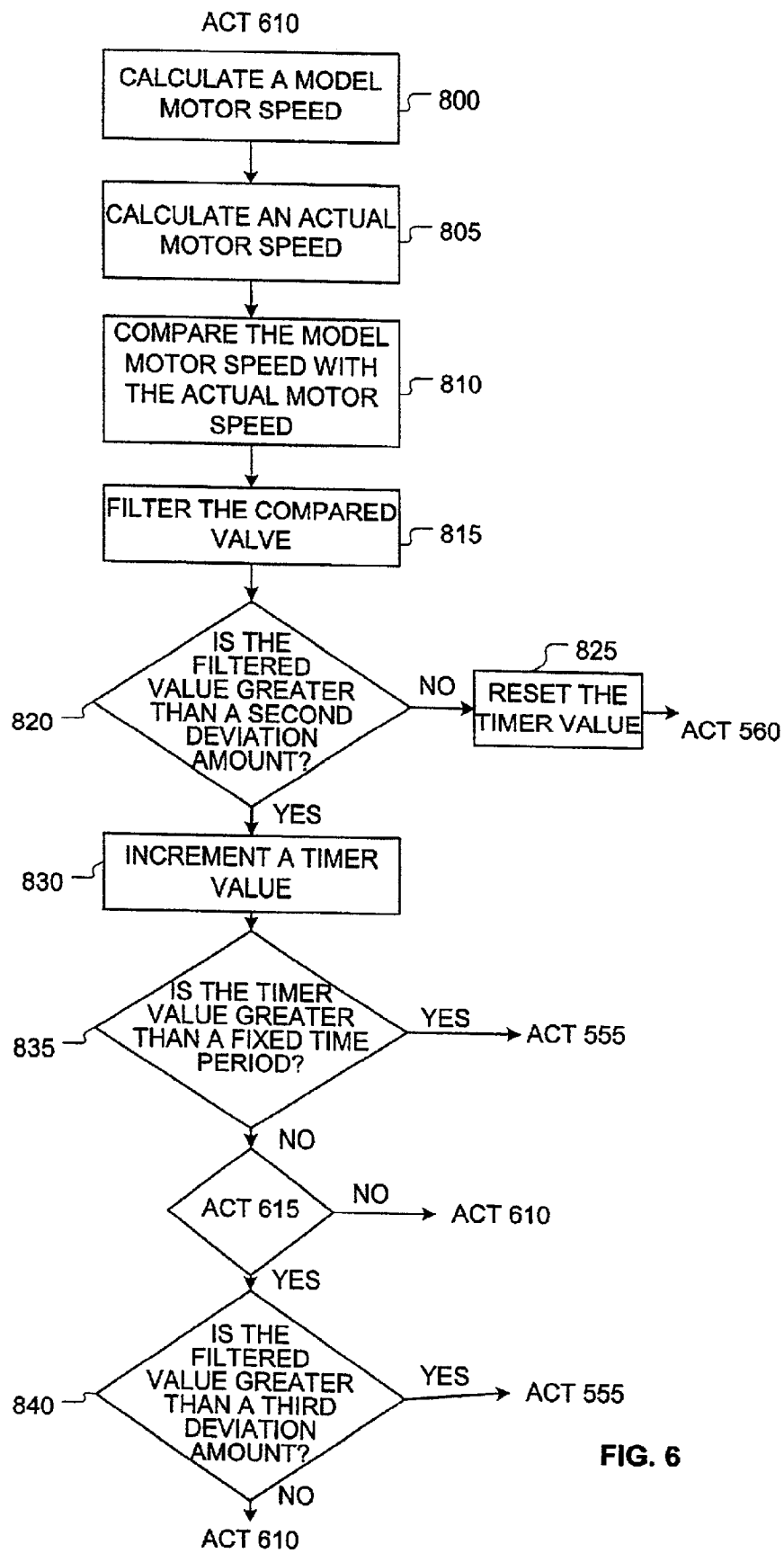
FIG. 6 is a flowchart of an exemplary method of determining if the actual motor speed is within a second range for a fixed time period, and if the actual motor speed is within a third range.

As shown in FIG. 6 and at act 800, the controller 85 calculates a modeled motor speed. In one embodiment, the controller 85 obtains from data storage memory 100 an algorithm to calculate the modeled motor speed from the commanded inverter signal. The modeled motor speed is based on the frequency $f_{out}$, the voltage $V_{out}$, and the current $I_{out}$ of the inverter signal.

At act 805, the controller 85 calculates an actual or calculated motor speed. In one embodiment, the controller 85 obtains a measured current value from current sensor 105. Based on the measured current value and the voltage $V_{out}$, the controller 85 calculates an actual motor speed as is known in the art.

At act 810, the actual motor speed is compared to the modeled motor speed. One method for making this comparison is subtracting the actual motor speed from the modeled motor speed and calculating an absolute value of the result.

At act 815, a filter having a smoothing time constant filters the resulting compared value. That is, a continuous digital signal of the compared absolute value is created and is filtered to remove high frequency noise. The filter may have a smoothing time constant between 0 ms and 100 ms with a preferred time constant of 0 ms (i.e., no filtering is performed).

At act 820, the controller compares the resulting filtered speed value to a second deviation amount or trip value. If the filtered value is greater then the second deviation amount, then the controller 85 determines the actual motor speed potentially varies too much from the modeled motor speed and proceeds to act 830. If the resulting filtered value is less than the second deviation amount, then the controller 85 proceeds to act 825. At act 825, the controller 85 resets a first timer value (discussed in act 830) to zero and proceeds to act 560.

At act 830, the controller 85 increments a first timer value. The first timer value represents a period of time that the filtered value is larger than the second deviation amount. If the first timer value is equal to or greater than a time period (act 835), then the controller 85 determines the load may lack integrity and proceeds to act 555. For example, the time period may be between 0 ms and 1 s with a preferred time period of 500 ms. If the incremental timer is less then the time period, then the controller proceeds to act 615.

At act 840, the controller 85 compares the resulting filtered value to a third deviation amount or trip value. If the filtered value is greater then the third deviation amount, then the controller 85 determines the actual motor speed varies too much from the modeled motor speed and proceeds to act 555. If the resulting compared value is less than the third deviation amount, then the controller 85 proceeds to act 610.

At act 555, the controller 85 generates an output that sets the brake 140. For the embodiment disclosed, the controller 85 removes the brake-control signal or sets the signal to 0VDC, resulting in the brake setting. Other methods may be used to set the brake 140.

At act 560, the controller 85 determines whether a direction signal is being provided to the controller 85. If a direction signal is still present (i.e., an operator is requesting the controller to raise or lower the load), then the controller returns to act 535. If no direction signal is present, then the controller 85 activates the brake (act 565) and proceeds to act 520.

As can be seen from the above, the present invention provides a new and useful material handling system and method of operating the same. Various features and advantages of the invention are set forth in the following claims.

What is claimed is:

1. A method of controlling a material handling system that lifts a load, the system including a motor, a brake and a drive, the method comprising:
storing a model of the motor;
generating a signal in the drive, the signal having a voltage and a frequency;
providing the signal to the motor;
sensing a current value of the signal;
providing a modeled value based in part on the sensed current value;
comparing an actual value to the modeled value to determine whether the load is stable; and
generating an output that sets the brake when the load is potentially unstable.

2. A method as set forth in claim 1 wherein the method further comprises entering a direction and speed into the drive, and generating the signal based in part on the entered direction and speed.

3. A method as set forth in claim 1 wherein the storing of the model includes
performing at least one test on the motor,
recording data during the test, and
creating the model based on the recorded data.

4. A method as set forth in claim 3 wherein the performing at least one test on the motor includes performing a static parameterization test on the motor.

5. A method as set forth in claim 3 wherein the performing at least one test on the motor includes performing a dynamic parameterization test on the motor.

6. A method as set forth in claim 3 wherein the performing at least one test on the motor includes performing a stepped-value parameterization test on the motor.

7. A method as set forth in claim 1 wherein comparing the actual value to the modeled value includes
obtaining a difference value relating to the difference between the actual value and the modeled value, and
comparing the difference value with a deviation amount.

8. A method as set forth in claim 7 wherein obtaining the difference value includes filtering the difference value.

9. A method as set forth in claim 7 wherein generating the output that sets the brake when the load is potentially unstable includes
incrementing a timer when the difference value is greater than the deviation amount, and
generating the output when the timer is greater than a time period.

10. A method as set forth in claim 7 wherein generating the output that sets the brake when the load is potentially unstable includes generating the output when the difference value is greater than a deviation amount.

11. A method of controlling a material handling system that lifts a load, the method comprising:
providing a material handling system having a motor, a brake, an inverter, and a model of the motor;
generating a signal in the inverter;
providing the signal to the motor;
sensing a current of the signal, the sensing occurring within the drive;
determining a modeled torque producing current based in part on the sensed current;
determining a modeled motor speed based in part on the sensed current;
determining an applied torque producing current;
determining an actual motor speed;
calculating a first difference value between the applied torque producing current and the modeled torque producing current;
comparing the first difference value with a first deviation amount;
setting the brake when the first difference value is greater than the first deviation amount;
calculating a second difference between the actual motor speed and the modeled motor speed;
comparing the second difference with a second deviation amount; and
setting the brake when the second difference is greater than the second deviation amount.

12. A method as set forth in claim 11 wherein calculating the first difference value includes filtering the first difference value.

13. A method as set forth in claim 11 wherein calculating the second difference value includes filtering the second difference value.

14. A method as set forth in claim 11 wherein determining an applied torque producing current includes determining the applied torque producing current based in part on the sensed current, and wherein determining an actual motor speed includes determining the actual motor speed based in part on the sensed current.

15. A method as set forth in claim 14 wherein determining the modeled torque producing current value includes
determining a modeled current based in part on the sensed current,
determining a magnetizing current based in part on the sensed current, and
determining the difference between the modeled current and the magnetizing current.

16. A method as set forth in claim 15 wherein determining the applied torque producing current includes determining the difference between the sensed current and the magnetizing current.

17. A method as set forth in claim 11 and further comprising:
comparing the second difference value with a third deviation amount;
incrementing a counter when the second difference value is greater than the third deviation amount; and
setting the brake when the counter is equal to a time period.

18. A method of sensing an unstable state of a material handling system that lifts a load, the system including a motor, a brake, and a drive, the method comprising:
providing a material handling system having a motor, a brake, an inverter, and a model of the motor;
generating a signal in the inverter, the signal including a voltage and a frequency;
providing the signal to the motor;
sensing a current of the signal, the sensing occurring within the drive;
when one of the voltage and the frequency is less than a first percentage of a maximum voltage and a maximum frequency, respectively,
determining a modeled current based in part on the sensed current,
determining a magnetizing current based in part on the sensed current, determining the difference between the modeled current and the magnetizing current, determining the difference between the sensed current and the magnetizing current, calculating a first difference value between the applied torque producing current and the modeled torque producing current;

comparing the first difference value with a first deviation amount;

setting the brake when the first difference value is greater than the first deviation amount;

when one of the voltage and the frequency is less than a second percentage of the maximum voltage and the maximum frequency, respectively, determining a modeled motor speed based in part on the sensed current;

determining an actual motor speed based in part on the sensed current;

calculating a second difference value between the actual motor speed and the modeled motor speed;

comparing the second difference value with a second deviation amount; and setting the brake when the second difference value is greater than the second deviation amount.

19. A method as set forth in claim 18 and further comprising when one of the voltage and the frequency is less than a third percentage of the maximum voltage and the maximum frequency, respectively, comparing the second difference value with a third deviation amount;

incrementing a counter when the second difference value is greater than the third deviation amount; and setting the brake when the counter is equal to a time period.

20. A method as set forth in claim 19 wherein the first percentage is fifty percent, the second percentage is fifteen percent, and the third percentage is thirteen percent.

21. A material handling system comprising:

a lifting apparatus being connectable to a load, the lifting apparatus including a brake, and a motor;

an inverter electrically connected to the motor and being operable to generate an inverter signal that drives the motor;

a current sensor being operable to sense a current of the inverter signal and to generate a current signal having a relationship to the sensed current; and a controller being operable to receive the current signal, determine a modeled value of the motor based in part on the current signal, compare an actual value to the modeled value for determining whether the load is stable, and generate an output that sets the brake when the load is potentially unstable.

22. A system as set forth in claim 21 wherein the system further comprises a memory, wherein the memory stores a model of the motor, and wherein the controller is operable to determine a modeled value by being further operable to access the model stored in memory.

23. A system as set forth in claim 21 wherein the controller is operable to compare the actual value to the modeled value by being further operable to obtain a difference value relating to the difference between the actual value and the modeled value, and compare the difference value with a deviation amount amount.

24. A system as set forth in claim 21 wherein the controller is operable to obtain a difference value by being further operable to filter the difference value.

25. A system as set forth in claim 23 wherein the controller is operable to generate the output that sets the brake by being further operable to increment a timer when the difference value is greater than the deviation amount, and generate the output when the timer is equal to a time period.

26. A system as set forth in claim 23 wherein the controller is operable to generate the output that sets the brake by being further operable to generate the output when the filtered value is greater than the deviation amount.

27. A system as set forth in claim 21 wherein the modeled value is a modeled torque producing current, and wherein the actual value is an applied torque producing current.

28. A system as set forth in claim 27 wherein the controller is operable to determine the modeled torque producing current by being further operable to determine a modeled current based in part on the current signal, determine a magnetizing current based in part on the current signal, and calculate the modeled torque producing current by subtracting the magnetizing current from the modeled current.

29. A system as set forth in claim 27 wherein the inverter signal has a voltage, wherein the controller is operable to determine the modeled torque producing current by being further operable to determine a modeled current based in part on the current signal and the voltage, determine a magnetizing current based in part on the current signal and the voltage, and calculating the modeled torque producing current by subtracting the magnetizing current from the modeled current.

30. A system as set forth in claim 28 wherein the controller is further operable to determine the applied torque producing current based in part on the current signal.

31. A system as set forth in claim 30 wherein the controller is operable to determine the applied torque producing current by being further operable to calculating the applied torque producing current by subtracting the magnetizing current from the current signal.

32. A system as set forth in claim 31 wherein the controller is operable to compare the applied torque producing current to the modeled torque producing current by being further operable to obtain a difference value relating to the difference between the applied torque producing current value and the modeled torque producing current value, and compare the difference value with the deviation amount.

33. A system as set forth in claim 31 wherein the controller is operable to obtain a difference value by being further operable to filter the difference value.

34. A system as set forth in claim 32 wherein the controller is operable to generate the output that sets the brake by being further operable to increment a timer when the difference value is greater than the deviation amount, and generate the output when the timer is equal to a time period.

35. A system as set forth in claim 32 wherein the controller is operable to generate the output that sets the brake by being further operable to generate the output when the difference value is greater than the deviation amount.

36. A system as set forth in claim 21 wherein the modeled value is a modeled motor speed, and wherein the actual value is an actual motor speed.

37. A system as set forth in claim 36 wherein the actual motor speed is based in part on the current signal.

38. A system as set forth in claim 37 wherein the inverter signal has a voltage and a frequency, and wherein the modeled motor speed is based in part on the current signal, the sensed voltage and the sensed frequency.

39. A system as set forth in claim 36 wherein the controller is operable to compare the actual motor speed to the modeled motor speed by being further operable to obtain a difference value relating to the difference between the actual motor speed and the modeled motor speed; and compare the difference value with a deviation amount.

40. A system as set forth in claim 36 wherein the controller is operable to obtain the difference value by being further operable to filter the difference value.

41. A system as set forth in claim 39 wherein the controller is operable to generate the output that sets the brake by being further operable to increment a timer difference value is greater than the deviation amount, and generate the output when the timer is equal to a time period.

42. A system as set forth in claim 41 wherein the controller is operable to generate the output that sets the brake by being further operable to generate the output when the difference value is greater than the deviation amount.

43. A system as set forth in claim 21 wherein the current sensor is a hall-effect sensor.

44. A system as set forth in claim 21 wherein the system further comprises a drive having a housing, and wherein the inverter, current sensor and controller are mounted within the housing.

* * * * *